United States Patent

Billarant

[11] Patent Number: 6,148,487
[45] Date of Patent: Nov. 21, 2000

[54] LAMINATED SELF-GRIPPING TAPE, MOLDED PRODUCT, AND METHOD OF MANUFACTURING A MOLDED ARTICLE INCLUDING A SELF-GRIPPING TAPE

[75] Inventor: Fabrice Billarant, Nantes, France

[73] Assignee: Aplix, France

[21] Appl. No.: 09/303,171

[22] Filed: Apr. 30, 1999

[30] Foreign Application Priority Data

Nov. 19, 1998 [FR] France ................................. 98 14556

[51] Int. Cl.⁷ .............................. A44B 18/00; B32B 7/00; F16B 5/00
[52] U.S. Cl. .................... 24/442; 24/306; 24/444; 24/451
[58] Field of Search ................... 24/442, 444, 451, 24/306

[56] References Cited

U.S. PATENT DOCUMENTS

| | | | |
|---|---|---|---|
| 5,061,540 | 10/1991 | Cripps et al. ......................... | 24/444 |
| 5,101,539 | 4/1992 | Kennedy et al. ..................... | 24/442 |
| 5,110,649 | 5/1992 | Morse et al. . | |
| 5,180,618 | 1/1993 | Kessler et al. ........................ | 24/444 |

FOREIGN PATENT DOCUMENTS

| | | | |
|---|---|---|---|
| 0 168 241 A2 | 1/1986 | European Pat. Off. . | |
| 2412736 | 7/1979 | France . | |
| 2 423 666 | 11/1979 | France . | |
| 39 03 847 A1 | 8/1990 | Germany . | |
| 6237807 | 8/1994 | Japan ...................................... | 24/442 |
| 1441328 | 6/1976 | United Kingdom .................... | 24/444 |

*Primary Examiner*—Victor N. Sakran
*Attorney, Agent, or Firm*—Adams, Schwartz & Evans, P. A.

[57] ABSTRACT

A laminated tape including a self-gripping sheet with hook-fastening elements, characterized by a layer of plastic foam and a layer of metal which can be attracted by a magnet and which is inserted between the layer of plastic and the self-gripping sheet.

12 Claims, 1 Drawing Sheet ately between 1 and 2 mm. The layer of foam has a# LAMINATED SELF-GRIPPING TAPE, MOLDED PRODUCT, AND METHOD OF MANUFACTURING A MOLDED ARTICLE INCLUDING A SELF-GRIPPING TAPE

TECHNICAL FIELD AND BACKGROUND OF THE INVENTION

This invention relates to a laminated tape comprising a sheet with hook-fastening elements, especially of the self-gripping type, a molded article comprising a tape of this kind, and a process for manufacturing a molded article of this kind.

To secure a tape of this kind to a molded article such as a cushion made of cellular or foam plastic for a seat in a car, airplane, etc. during the molding operation, the tape is arranged on the inside of the mold, generally on the base, the face of the self-gripping sheet bearing self-gripping elements turned toward the inside wall of the mold. The foam is poured into the mold. The liquid foam comes into contact with the other face of the sheet. Once the foam is cured, the article is removed from the mold. The surface of the article then comprises self-gripping elements that allow covering fabrics or the like to be secured thereto. During the molding and securing operation, the self-gripping elements should be well protected from any contact with the liquid or pasty foam to prevent deterioration of their self-gripping power.

To protect these self-gripping elements, the art already includes the provision of a cavity formed by two ribs which project from the inside face of the mold and between which the tape is received. The latter is made of a material that is flexible enough to be inserted by force into the cavity and thus to create an impermeable space bounded by the ribs, the base of the mold, and the tape which is slightly bent and presses against the ribs. In theory, therefore, the self-gripping elements are protected from the infiltration of the liquid foam when it is poured into the mold. This method is time-consuming because the operator has to force the tape into the cavity each time. Secondly, it has been found in practice to be not very effective in preventing the penetration of the liquid foam into the impermeable space.

In order to improve the securing operation, thought was already given to gluing a metal strip to one of the faces of the sheet and to magnetizing the base of the cavity. The magnetizing effect thus keeps the tape properly oriented with its self-gripping elements on the side of the interior surface of the mold and it no longer turns, especially under the effect of the foam being poured. However, the liquid foam still tends to infiltrate through the interstices of the bond between the tape and the ribs which do not have a perfect seal. This type of product is disclosed in Applicant's French Patent No. 7804001, for example. Applicant's French Patent No. 7804001 also provides for replacing the metal strip with a layer of foam having the same function as the strip, that is, keeping the tape in place and preventing it from turning. The problem is not eliminated in either case, however.

An attempt was also made to overcome this difficulty by providing for the arrangement of a protective film on the self-gripping elements which are kept properly oriented toward the base of the cavity by means of the metal strip and are protected from the liquid foam by the protective film. However, this type of tape is not cost-effective in terms of production because the tapes are more expensive and take longer to manufacture. That is, protective films are added and have to be removed before fabric, for example, is secured to the article.

SUMMARY OF THE INVENTION

Therefore, it is an object of the invention to provide a tape of the kind that will guarantee proper downward orientation of the hook-fastening elements and their protection from the liquid foam, while at the same time being simpler to use and less costly than tapes of the prior art. According to the invention, the laminated tape with a self-gripping sheet and hook-fastening elements is characterized by a layer of foam plastic as well as by a layer of metal which can be attracted by a magnet and which is inserted between the layer of plastic and the self-gripping sheet.

Providing the face of the self-gripping ribbon which lacks any hook-fastening elements, in succession, with a layer of metal and a layer of foam compatible with the foam to be poured onto the tape will result in still proper orientation of hook-fastening elements toward the base of the cavity of the mold (magnetization preventing the tape from being turned by the forces created when the foam is poured) and good protection of the hook-fastening elements, the edges of the layer of foam being inserted by the pressure of the poured foam into the interstices between the tape and the ribs and thus preventing the liquid foam from penetrating below the tape and contaminating the hook-fastening elements.

It is another object of the invention to provide for a molded article comprising a tape according to the invention and to provide for a molded article manufacturing process comprising the steps of arranging a tape according to the invention on a magnetized inside surface of a mold between two longitudinal ribs extending from the mold, leaving an interstice between the ribs and the edges of the tape; pouring molding product in the form of a first plastic foam into the mold, allowing it to solidify into the foam plastic of the foam ribbon, and withdrawing the article from the mold.

The self-gripping ribbon has a thickness between 0.5 mm and 3 mm, preferably between 1 and 2 mm. The layer of metal has a thickness between 0.5 mm and 2.5 mm, preferably between 1 mm and 2 mm. The layer of foam has a thickness of 1 to 8 mm, preferably 3 to 5 mm.

The layer of foam may be a polyether, especially polyurethane.

The layer of metal may consist of iron or any other metal or alloy that can be attracted by a magnet.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
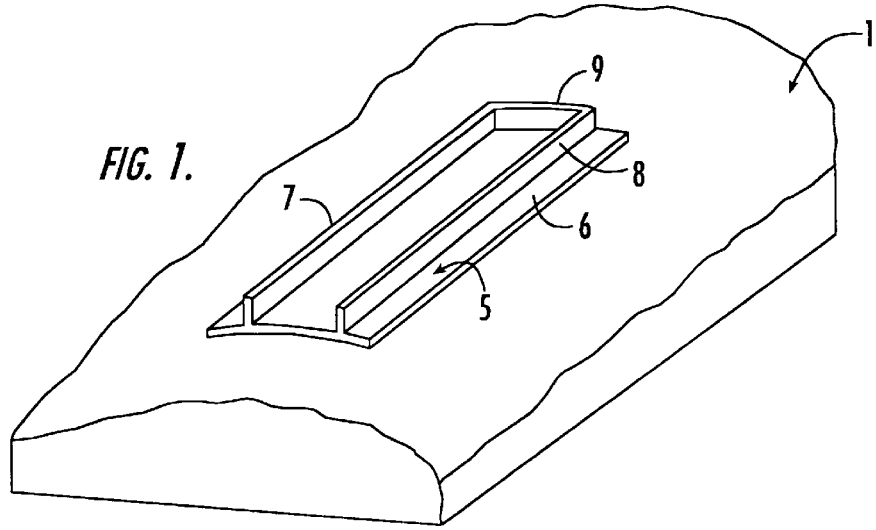
FIG. 1 is a perspective view of a part of a mold according to the invention.
Figure 2:
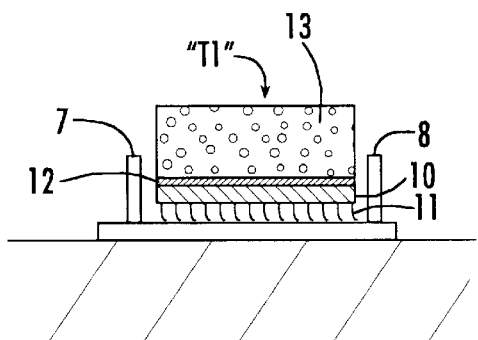
FIG. 2 a cutaway view of the mold in FIG. 1 in which a tape according to the invention is inserted.

Referring now specifically to the drawings, FIG. 1 illustrates the base of a mold 1 made of aluminum, for example, for making a molded article 2, such as a polyurethane foam cushion, as shown by way of example. The aim is to provide the cushion 2 at predetermined locations with hook-fastening elements 11 (see FIG. 2) in the form of self-gripping hooks designed to hold a cover 4. The base of the mold 1 comprises, an its interior face, a shaped piece 5 consisting of a plate 6 for mounting on the mold, two longitudinal ribs 7, 8, and transverse ribs 9 (only one shown in the drawing).

Figure 3:
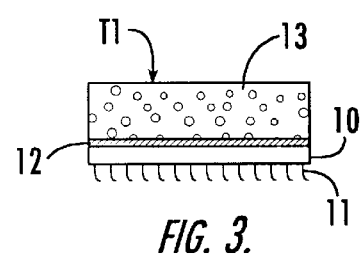
FIG. 3 is a cutaway view of a tape according to the invention.

FIG. 3 illustrates a first embodiment of a tape T1 according to the invention. The tape T1 consists of a ribbon 10 made of a flexible material such as a polyamide or polyester, one of its faces having hook-fastening elements 11 in the form of hooks or mushroom-like shapes. One layer of metal 12 is secured by gluing to the other face of the ribbon 10. A layer of foam 13 is secured by gluing to the layer of metal 12. The foam of the layer of foam 13 is compatible with the poured foam of the molded cushion 2.

Figure 4:
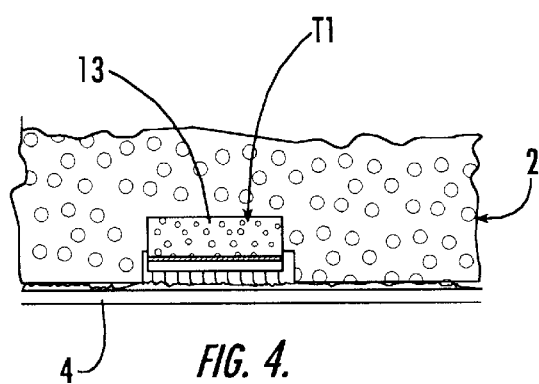
FIG. 4 represents the finished molded article bearing the tape and receiving a lining.

Depending on the embodiment in FIG. 3 or FIG. 4, the width of the ribbon 10 or of the layer of foam 13 is substantially equal to and preferably slightly less than the distance separating the two longitudinal ribs 7, 8, for example, 0.5 to 5 mm, so that the tape can be easily inserted between the ribs 7, 8 without having to use force for the insertion.

The process for making the tape T1 is as follows. A sheet of fabric made of polypropylene having self-gripping elements on one of its faces is coated on its other face with a metallization layer that contains a binder. A layer of foam is then applied to the layer of metal by lamination or foaming (flame system). The sheet is then cut into any desired shape, such as the ribbon 10, that corresponds with the shape of the cavity.

The process for making the cushion 2 is as follows:

The part of the mold 1 is magnetized on its inside surface at the place where the cavity 5 is located. The ribbon 10 is arranged by the operator or by a robot arm between the between the longitudinal ribs 7, 8 of the cavity 5, the hooks 11 being directed downward in the direction of the inside surface of the mold 1. A small interstice measuring about 0.5 mm to 5 mm, for example, is left between the ribs and the ribbon 10. Once the ribbon 10 is in position, the liquid molding product is poured in the mold. The layer of foam 13 tends to deform under the pressure of the liquid molding product, its longitudinal edges 14, 15 spreading toward the outside of the ribbon 10 under the effect of the expansion of the foam in the viscous phase and, vis-a-vis the liquid molding product, tightly closing off the interstices between the ribs 7, 8 and the ribbon 10, thus protecting the hooks 11.

Once the molding product is solidified and bonded to the layer of foam 13, the cushion 2 can be withdrawn from the mold 1, the hooks 11 thus being laid bare and now able to serve as a hooking means for the cover 4 (see FIG. 4).

The molding product is a polyether, especially polyurethane, having the same density as the one used for the foam of the tape, or it can have a different density. It can also be any molding product if it is compatible with the foam of the tape. That is, the two products must adhere to each other when the molding product is solidified. The layer of metal 12 is formed by coating the face not bearing hooks of the ribbon 10 with a preparation of nitrile polyurethane adhesive with iron powder added, the proportion of iron being at least 75% by weight and 1 mm thick.

The 4 mm thick layer of foam 13 is made of a polyether such as polyurethane or some other thermosetting material.

Figure 5:
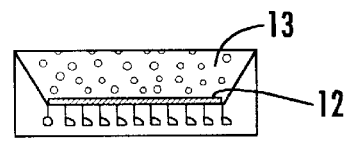
FIG. 5 is a cutaway view of the mold in FIG. 2 in which a tape is inserted in accordance with another embodiment of the invention.

As shown to FIG. 5, the transverse section of the layer of foam 13 is truncated, the upper width of the layer being more than the lower width of the layer in contact with the layer of metal 12 having the same width. Because of this beveled arrangement of the layer of foam, the tape T1 can even be used in housings that would otherwise be too big. There is therefore less need for mutual adaptation of the housing and the width of the tape and use can be made of the same housings for different tape widths.

A laminated self-gripping tape is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A laminated tape adapted for being bonded to a first plastic foam material having an outer surface, wherein said laminated tape comprises:

(a) a self-gripping sheet having hook-fastening elements thereon;

(b) a second plastic foam material having an inner face and an outer face, said outer face being adapted for being bonded to said outer surface of said first plastic foam material, the first plastic foam material adapted for being poured in liquid form on said second plastic foam material and fixing itself to the second plastic foam material by solidification; and (c) a layer of magnetically-attractable material adapted for maintaining proper orientation of said hook-fastening elements relative to a magnetically-attractable mold pocket within which said laminated tape is adapted to be placed with the hook-fastening elements in contact with the bottom of said mold pocket, said magnetically attractable material being positioned between said inner face of said second plastic foam material and said self-gripping sheet.

2. A laminated tape as defined in claim 1, wherein said tape has a shape of a ribbon.

3. A laminated tape as defined in claim 2, wherein said ribbon is comprised of a flexible material.

4. A laminated tape as defined in claim 1, wherein in transverse section, the upper width of said second plastic foam material is greater than the lower width of said first plastic foam material, the lower width of said second plastic foam material being equal to the width of said layer of magnetically attractable material.

5. A molded article comprising:

(a) a body in a first plastic foam material; and (b) a laminated tape, said laminated tape including a first plastic foam material having respective inner and outer layers, a self-gripping sheet having hook-fastening elements thereon and extending outwardly from said body, and a layer of magnetically-attractable material positioned between said outer layer and said self-gripping sheet, the laminated tape being bonded to said first plastic foam material on the outer face of said second plastic foam material layer.

6. A molded article as defined in claim 5, wherein said laminated tape has a shape of a ribbon.

7. A molded article as defined in claim 6, wherein said ribbon is comprised of a flexible material.

8. A method for assembling a molded article, comprising the steps of:

(a) providing a laminated tape including a first plastic foam material having respective inner and outer layers, a self-gripping sheet having hook-fastening elements thereon and extending outwardly from said body, and a layer of magnetically-attractable material positioned between said outer layer and said self-gripping sheet;

(b) placing said laminated tape in a pocket defined in the bottom of a mold with said hook-fastening elements in contact with the bottom of said pocket;

(c) pouring said first plastic foam material in liquid form into said mold and allowing the first plastic foam material to solidify, a second plastic foam layer of the tape being then bonded by its outer face to the first plastic foam material; and (c) withdrawing said molded article from the mold.

9. A method as defined in claim 8, wherein the step of placing said laminated tape in a pocket defined in the bottom of a mold includes the steps of providing first and second ribs extending from the bottom of the mold, the tape being positioned between said first and second ribs while leaving an interstice between each rib and a respective edge of the tape.

10. A method as defined in claim 9, wherein said interstice has a width comprised between 0.5 mm and 5 mm.

11. The method as defined in claim 8, wherein the step of providing said laminated tape includes the step of providing a ribbon-shaped laminated tape.

12. The method as defined in claim 11, wherein the step of providing said laminated tape includes the step of providing a self-gripping sheet comprised of a flexible material.

* * * * *